(12) United States Patent
Heller

(10) Patent No.: US 6,548,143 B1
(45) Date of Patent: Apr. 15, 2003

(54) REINFORCEMENTS FOR SEALING, FINISHING AND TRIMMING STRIPS

(75) Inventor: Norbert Heller, Grefrath (DE)

(73) Assignee: GenCorp Property Inc., Sacramento, CA (US)

( * ) Notice: Subject to any disclaimer, the term of this patent is extended or adjusted under 35 U.S.C. 154(b) by 0 days.

(21) Appl. No.: 09/856,210

(22) PCT Filed: Nov. 11, 1999

(86) PCT No.: PCT/GB99/03766

§ 371 (c)(1),
(2), (4) Date: May 18, 2001

(87) PCT Pub. No.: WO00/29237

PCT Pub. Date: May 25, 2000

(30) Foreign Application Priority Data

Nov. 18, 1998 (GB) .............................................. 9825204

(51) Int. Cl.⁷ ................................................ B32B 3/26
(52) U.S. Cl. ...................................... 428/122; 49/490.1
(58) Field of Search .......................... 428/122; 49/490.1

(56) References Cited

U.S. PATENT DOCUMENTS

| | | | |
|---|---|---|---|
| 4,188,765 A | * | 2/1980 | Jackson ..................... 49/490.1 |
| 4,232,081 A | | 11/1980 | Pullan |
| 4,271,634 A | | 6/1981 | Andrzejewski |
| 4,348,443 A | | 9/1982 | Hein |
| 4,411,941 A | | 10/1983 | Azzola |
| 4,542,610 A | | 9/1985 | Weimar |
| 4,702,039 A | | 10/1987 | Bocchinfuso |
| 4,902,549 A | | 2/1990 | Bright et al. |
| 4,959,081 A | | 9/1990 | Mathellier |
| 5,403,632 A | | 4/1995 | Mesnel et al. |
| 6,119,404 A | * | 9/2000 | Bschorr et al. ............ 49/490.1 |

FOREIGN PATENT DOCUMENTS

| | | |
|---|---|---|
| DE | 37 43 970 A1 | 7/1989 |
| EP | 0 418 116 A1 | 3/1991 |
| EP | 0 437 964 A2 | 7/1991 |
| EP | 0 473 283 A1 | 3/1992 |
| EP | 0 656 282 A1 | 6/1995 |
| GB | 1022704 | 3/1966 |
| GB | 2 294 964 A | 5/1996 |
| WO | WO 98/25780 A1 | 6/1998 |

* cited by examiner

*Primary Examiner*—Alexander S. Thomas
(74) *Attorney, Agent, or Firm*—Leydig, Voit & Mayer, Ltd.

(57) ABSTRACT

A sealing, trimming or finishing strip, comprises a channel-shaped gripping portion (5) supporting a soft hollow sealing portion (6). The gripping portion (5) comprises extruded material (8) in which is embedded a resilient reinforcement or carrier (10). The strip may be mounted in position on a mounting flange running around an opening in a motor vehicle body by forming it so that the side walls of the gripping portion (5) are initially splayed apart for ease of mounting on the flange, and are then forced together into gripping engagement with the flange by means of a tool which is externally passed along the length of the gripping portion and applies inwardly directed forces to its side walls (10A, 10B) of the carrier are integrally connected to a central part (10C) in the base of the channel by inclined regions (10D, 10E). These regions (10D, 10E) avoid sharp corners at the junctions between the side walls and the base of the carrier (10), and thus reduce the possibility that the force-applying fitting tool will crush the extrude plastics or rubber material (8) at such junctions, possibly causing damage and externally visible marks.

2 Claims, 2 Drawing Sheets

REINFORCEMENTS FOR SEALING, FINISHING AND TRIMMING STRIPS

The invention relates to reinforcements (referred to below as "carriers") for sealing, trimming and finishing strips. Sealing, trimming and finishing strips incorporating carriers according to the invention, and to be described by way of example only in more detail below, may be used for sealing, trimming and finishing purposes in motor vehicle body construction. However, they may be used for many other purposes.

According to the invention, there is provided a reinforcement or carrier for a channel-shaped sealing, trimming or finishing strip, the carrier being made of channel-shaped resilient material and comprising opposite side parts forming the side walls of the channel, a base part forming the base of the channel, and connecting parts integrally connecting the base part to each of the side parts, characterised in that the connecting parts are devoid of sharp corners.

According to the invention, there is further provided a sealing, trimming or finishing strip, comprising: a generally channel-shaped gripping portion for mounting on a flange and comprising extruded plastics or rubber material; a generally channel-shaped carrier made of resilient material embedded in the plastics or rubber material; the carrier being configured with side parts forming the side walls of the channel of the carrier, a base part forming the base of the channel of the carrier and connecting parts integrally connecting the base part to each of the side parts; the side walls of the gripping portion including the side parts of the carrier being splayed outward to facilitate mounting of the gripping portion on the mounting flange and being adapted to be moved subsequently towards each other and into embracingly gripping relationship with the flange by means of a tool passed along the outside of the gripping portion and applying oppositely directed forces to the outsides of the side walls of the gripping portion, characterised in that the connecting parts of the carrier are substantially rectilinear parts which are inclined both to the base part and to the side parts to avoid a sharp corner between each side part and the base part.

Carriers embodying the invention, and incorporated in sealing, trimming and finishing strips for motor vehicle bodies, will now be described, by way of example only, with reference to the accompanying diagrammatic drawings in which.

Figure 1:
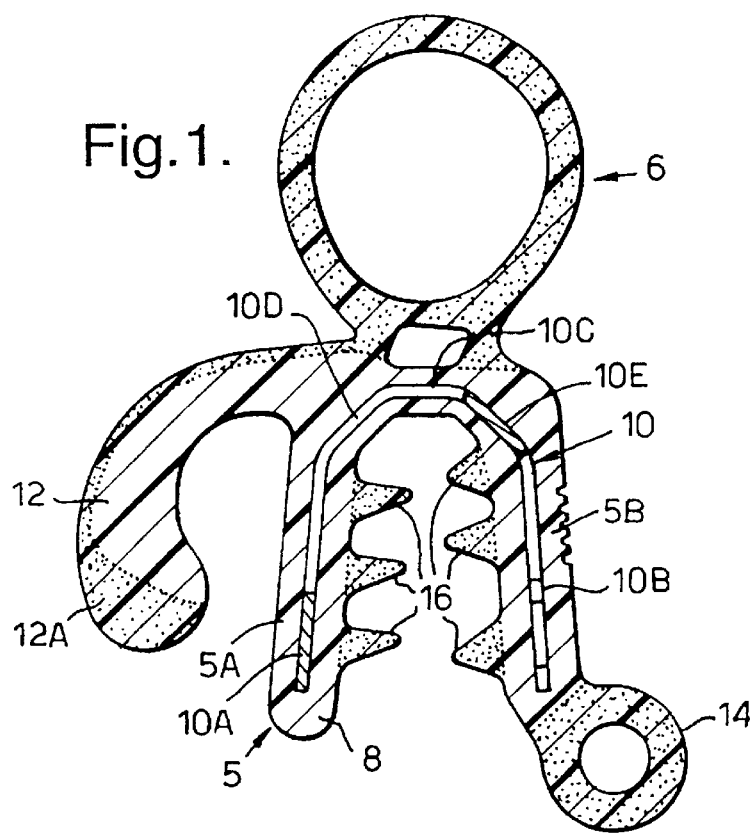
FIG. 1 is a cross-section through one of the strips.

As shown in FIG. 1, the strip has a channel-shaped gripping portion 5 integrally supporting a hollow tubular sealing portion 6. The gripping portion 5 comprises extruded plastics or rubber material 8 incorporating a carrier 10 which is also of channel shape and extends along the length of the strip. The extruded material 8 integrally extends to form the tubular sealing part 6. In addition, the material 8 extends to form a lip 12 on one side 5A of the channel and a tubular foot 14 on the other side 5B of the channel, the lip and the foot extending along the length of the strip.

In use, the strip is mounted on a flange running around a closeable opening on a motor vehicle body. The strip shown in FIG. 1 is suitable for mounting around a luggage boot opening. The flange is formed where the inner and outer body panels come together around the luggage boot opening and are welded together. The gripping portion 5 is placed over this flange and embracingly grips the flange to mount the strip in position. The gripping action of the gripping portion 5 is assisted by inwardly directed gripping lips 16 integrally formed with the extruded material 8. When mounted in this way, the sealing portion 6 is positioned around the opening so as to be sealingly compressed by the lid or closure member for the opening. A weather-proof seal is thereby produced. The lip 12 becomes positioned around the inside of the opening and embraces the edge of the trim panel or fabric on the inside of the opening. Lip 12 is termed a "cosmetic lip". The tubular foot 14 provides an additional seal for the closed lid.

Figure 2:
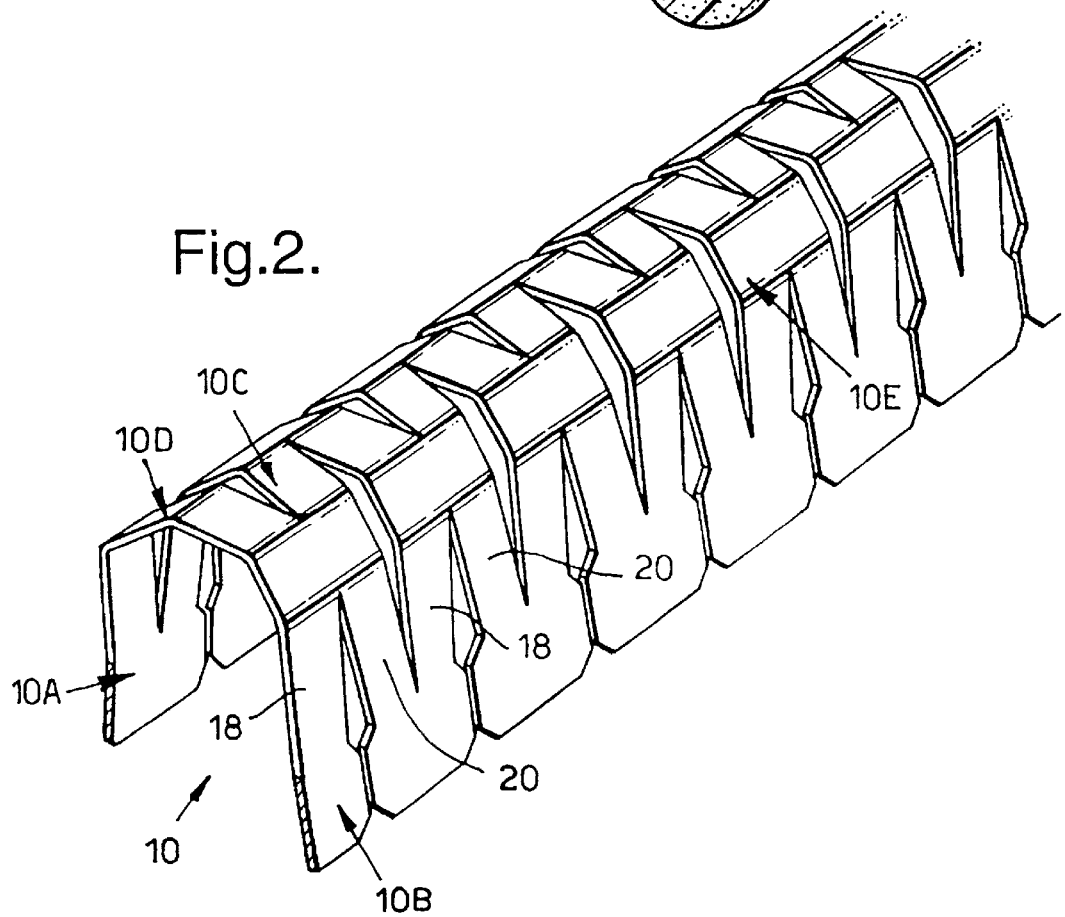
FIG. 2 is a perspective view of one form which the carrier of the strip shown in FIG. 1 may take.

The carrier 10 has sides 10A and 10B and substantially rectilinear connecting parts 10C, 10D and 10E. It is preferably made of metal, but may be made of other material such as suitable plastics material. It may comprise apertured or unapertured channel-shaped material. As shown in FIG. 2, it may comprise a series of inverted U-shaped elements 18 integrally connected by connecting links 20. Instead, the elements 18 may be completely disconnected from each other. In another form, the carrier is made of looped wire. Other forms of carrier are possible.

The carrier 10 is preferably incorporated into the extruded material 8 using a cross-head extruder. Different parts of the extruded material may have different hardnesses. Thus, the sealing portion 6 will normally be softer than the channel-shaped material of the gripping portion 5, and will advantageously be made of cellular or foamed form. Preferably, the lips 16 are relatively soft, softer than the channel-shaped material of the gripping portion, in order to increase their frictional grip on the flange. The outer part 12A of the cosmetic lip can also be made of softer material, preferably cellular, to improve its appearance. In addition, the tubular foot 14 can be made of soft cellular material.

The strip may be formed with a hollow chamber 22 extending along the length of the strip to increase the softness of the sealing portion 6.

Figure 3:
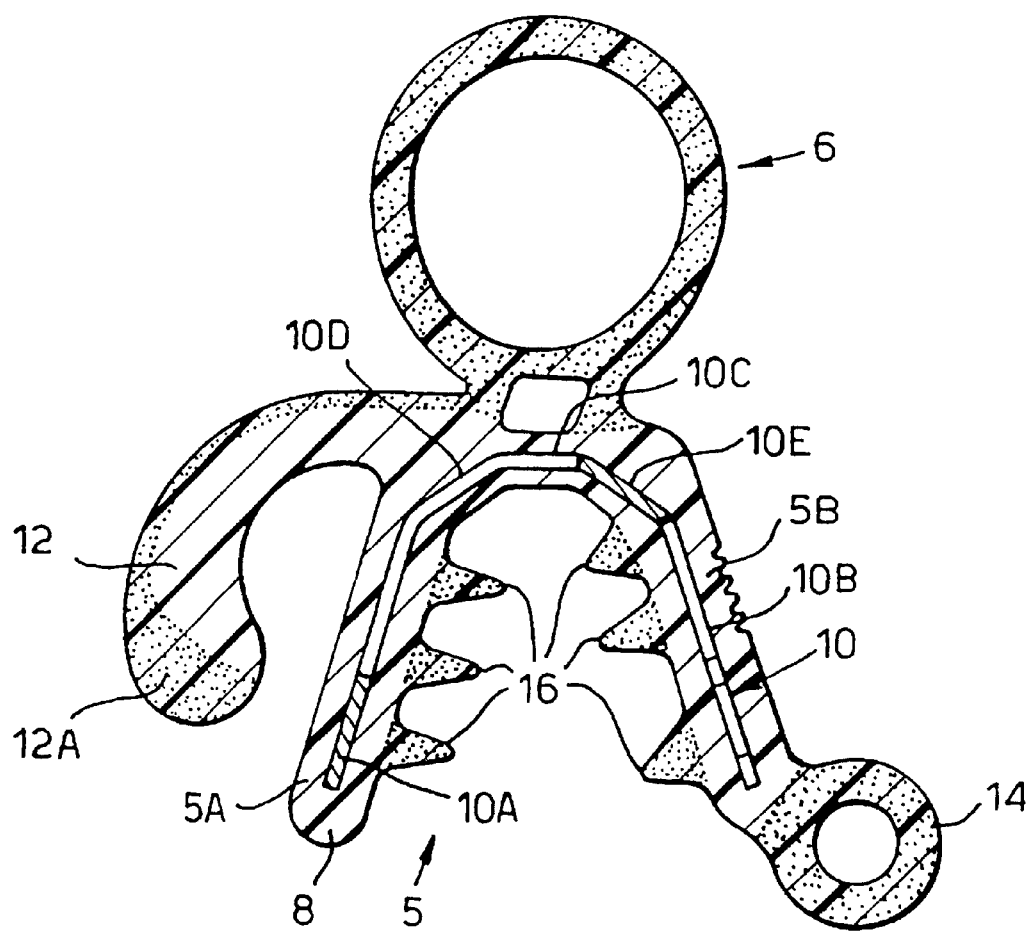
FIG. 3 is a cross-section corresponding to FIG. 1 but showing the strip in a configuration which it has before being mounted in position on the vehicle.

FIG. 3 shows the form which the sealing strip may have before mounting on the flange. As shown, the side walls of the gripping portion 5 are splayed apart, as also, of course, are the sides of the carrier 10. In this configuration, it is easy to mount the strip on the mounting flange. Thereafter, the side walls of the gripping portion 5 are urged towards each other, into gripping engagement with the sides of the flange, by using a suitable tool, such as one of the tools described in our United Kingdom Patent Specification No. 2215762, our German Patent Specification No. 3903809 and our U.S. Pat. Specification No. 4996756. Such a tool has a pair of rollers rotatable about parallel axes and mounted side-by-side with a gap between them. A third roller, rotatable about an axis perpendicular to the axes of the pair of rollers, extends transversely across the gap between them. The tool is placed over the strip on the flange so that the gripping portion 5, and the cosmetic lip 12, are within the gap between the pair of parallel rollers, and so that the third roller compresses the sealing portion 6. The tool is then driven along the length of the strip so that the pair of parallel rollers apply sideways forces against the splayed-apart walls of the gripping portion 5 and move them into the configuration shown in FIG. 1 so that they embracingly grip the mounting flange. The embracing grip of the gripping portion 5 is assisted by the resilience of the carrier.

In accordance with a feature of the carrier, its side walls 10A, 10B are connected to the central part 10C by the inclined parts 10D and 10E, the parts 10D and 10E being inclined both to the sides 10A and 10B and to the central part 10C and being covered by covering material 8 which is convexly curved outwardly. The parts 10D and 10E avoid sharp corners between the side walls 10A and 10B and the central part 10C. Such sharp corners can be disadvantageous because there may be a tendency for the fitting tool to crush the extruded material 8 against such sharp corners, producing externally visible marks on the strip. The same benefit can be obtained by other configurations for the carrier, which avoid sharp corners between the side walls 10A and 10B and the part connecting them.

The configuration of the strip shown in the Figures is given purely by way of example. Many variations are possible. For example, if the strip is to be mounted on the flange around a door opening on a motor vehicle, the sealing portion 6 would normally be mounted on the outside of side wall 5B of the gripping portion 5, instead of on the outside of its inverted base. In this way, the gripping portion 5 mounts the sealing portion to run around the outside of the flange so as to be sealingly compressed by the closing door.

What is claimed is:

1. A sealing, trimming or finishing strip, comprising a generally channel-shaped gripping portion comprising extruded plastics or rubber material; a generally channel-shaped carrier made of resilient material embedded in the plastics or rubber material; the carrier being configured with side parts forming the side walls of the channel of the carrier, a base part forming the base of the channel of the carrier and connecting parts integrally connecting the base part to each of the side parts; the connecting parts of the carrier being substantially rectilinear parts which are inclined both to the base part and to the side parts to avoid a sharp corner between each side part and the base part; the side walls of the gripping portion including the side parts of the carrier being splayed outward and being adapted to be moved substantially towards each other into a mounting position; the outside surfaces of the covering material over the two connecting parts being convexly curved outwardly, the inclination of the connecting parts reducing damage by the carrier to the covering material when the side parts are moved subsequently towards each other and into embracingly gripping relationship with a flange by means of a tool passed along the outside of the gripping portion which applies oppositely directed forces to the outsides of the side walls of the gripping portion.

2. A strip according to claim 1, in which the gripping portion supports a longitudinally extending externally mounted sealing portion.

\* \* \* \* \*